A. PANALLE.
NUT LOCK.
APPLICATION FILED DEC. 10, 1910
1,031,579. Patented July 2, 1912.
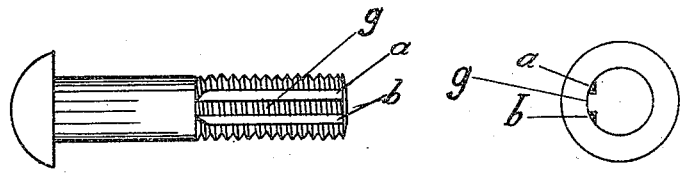
Fig. 1      Fig. 2
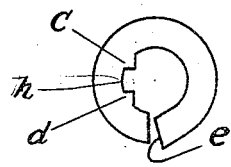      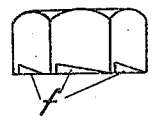
Fig. 5.      Fig. 3.
      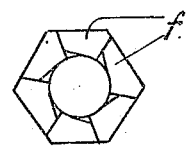
Fig. 6.      Fig. 4.
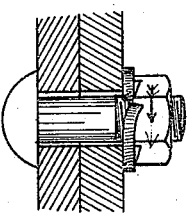      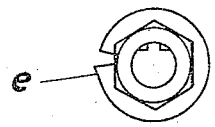
Fig. 7.      Fig. 8.
WITNESSES      INVENTOR

UNITED STATES PATENT OFFICE.

ANATOLE PANALLE, OF NEW ORLEANS, LOUISIANA.

NUT-LOCK.

1,031,579.  Specification of Letters Patent.  Patented July 2, 1912.

Application filed December 10, 1910. Serial No. 596,728.

*To all whom it may concern:*

Be it known that I, ANATOLE PANALLE, a citizen of the United States, residing in the city of New Orleans, parish of Orleans, State of Louisiana, have invented certain new and useful Improvements in Nut-Locks, of which the following is a specification.

My invention pertains to nut locks; and it consists in the peculiar and advantageous nut lock hereinafter described and definitely claimed.

In the drawings, accompanying and forming part of this specification: Figure 1 is a side elevation of the bolt comprised in my novel combination. Fig. 2 is an end elevation of the same. Fig. 3 is an edge elevation of the nut comprised in the improvement. Fig. 4 is an elevation of the inner side of the nut. Fig. 5 is a side elevation, and Fig. 6 an edge elevation of the washer that locks the nut. Fig. 7 is a view, on a reduced scale and partly in elevation and partly in section, showing the device in use. Fig. 8 is a view showing the relative sizes of the bolt, nut and washer.

Similar letters of reference designate corresponding parts in all of the views of the drawings.

In furtherance of my invention the threaded shank of the bolt is provided with two longitudinal and parallel grooves $a$ and $b$, the walls of each of which in cross-section describe a right-angle, Fig. 2, and a longitudinal rib $g$ that is produced by the formation of the said grooves and is arranged between the same. Also the nut is provided at its inner side with teeth $f$ each of which has an end disposed in the direction of the length of the bolt and a side that is inclined outward to the end of the next forward tooth, with reference to the direction in which the nut is turned to move it up on the bolt shank.

Surrounding the bolt shank and interposed between the inner and toothed side of the nut and an element through which the bolt shank extends is the washer of my improvement. The said washer has an opening to receive the bolt shank and also has its ends separated by an intervening space so as to permit of the end $e$ being deflected or bent outward to form a dog, designed to coöperate with the teeth $f$ of the nut. It is further provided with tongues $c$ and $d$ arranged on its inner edge and shaped in conformity to the cross-sectional shape of the grooves $a$ and $b$; the said tongues $c$ and $d$ being separated by an intervening space $h$ of a shape and size to snugly receive the rib $g$ of the bolt shank.

The dog $e$ of the washer is arranged parallel to the sides of the teeth $f$ on the nut, and hence it will be manifest that while the said dog will permit of the nut being turned up on the bolt to the position shown in Fig. 7, the dog will by abutting against the end of the tooth that is opposed to it, preclude turning or loosening of the bolt in a retrograde direction.

When it is desired to turn the nut off the bolt, the dog $e$ is bent back into the plane of the major portion of the washer, in which position it will remain because of the washer being made of malleable iron, and hence it will be manifest that after the dog $e$ is bent back as stated, the washer will not interfere with retrograde turning and removal of the nut. The washer made of malleable iron is also advantageous, inasmuch as there is no liability of its dog being casually disengaged from the toothed side of the nut by the great vibration to which bolts and nuts are ordinarily subjected when used in railways.

By reason of the bolt shank being provided with the grooves $a$ and $b$ and the rib $g$, it will be observed that the malleable iron washer, provided with the correspondingly shaped tongues $c$ $d$ and intervening space $h$, is strongly held against turning on the bolt shank and at the same time the bolt shank by entirely occupying all of the central opening and the space $h$ in the bolt is enabled to effectually reinforce the washer and prevent the same bending and giving in the direction indicated by arrow in Fig. 7, no matter how great the tendency of the nut to turn in said direction. It will also be observed that the washer is prevented from bending and giving in the direction opposite to that indicated by arrow in Fig. 7; the bending and giving of the malleable iron washer being resisted in either direction by the bottom walls of the grooves $a$ and $b$, as well as by the sides of the rib $g$, with the result that in case of tendency of the washer to turn on the bolt a large surface of the bolt is opposed to a correspondingly large surface of the washer. This will be appreciated as an important advantage when it is borne in mind that the washer, as before stated, is made of malleable iron so that after the dog e is bent back the washer will not interfere with retrograde turning and removal of the nut.

I claim:

The herein described nut lock consisting essentially of a bolt having a threaded shank provided with spaced and parallel longitudinal grooves, the walls of each of which in cross-section describe a right-angle, and also provided with a longitudinal rib arranged between the grooves throughout the length thereof; a nut mounted on the bolt shank and having teeth at its inner side; and a washer surrounding the bolt shank, at the inner side of the nut, and having tongues on its inner edge corresponding in shape to and fully occupying the grooves of the bolt shank and also having a space between said tongues corresponding in shape to and snugly receiving the rib of the bolt shank and further having its ends separated by an intervening space and one of the said ends bent outward from the major portion of the washer to form a dog for engaging the teeth of the nut, the said washer being of malleable iron to permit of the said dog being bent back into the plane of the remainder of the washer when it is desired to turn the nut off the bolt shank.

ANATOLE PANALLE.

Witnesses:
C. O. Hinz,
L. S. Genslinger.

Copies of this patent may be obtained for five cents each, by addressing the "Commissioner of Patents, Washington, D. C."